United States Patent [19]
Cohen

[11] 3,906,642
[45] Sept. 23, 1975

[54] COMBINED SPORT SHOE AND EDUCATIONAL DEVICE

[75] Inventor: William J. Cohen, Randolph, Mass.
[73] Assignee: CITC Industries, Inc., New York, N.Y.
[22] Filed: June 19, 1974
[21] Appl. No.: 480,879

[52] U.S. Cl. .................................. 35/8 R; 36/2.5 E
[51] Int. Cl.² .................................................. G09B 1/00
[58] Field of Search ....... 35/57, 8 R, 1; 36/1, 2.5 R, 36/50, 2.5 E

[56] References Cited
UNITED STATES PATENTS

| | | | |
|---|---|---|---|
| 2,313,874 | 3/1943 | Hume | |
| 2,385,197 | 9/1945 | Eisel | 35/1 |
| 2,646,630 | 7/1953 | Miller | 35/1 |
| 2,991,561 | 7/1961 | Moore et al. | 35/8 R |

Primary Examiner—Patrick D. Lawson
Attorney, Agent, or Firm—Waters, Schwartz & Nissen

[57] ABSTRACT

A sport shoe construction which includes, in combination therewith, a novel educational device for teaching a wearer to lace and tie the shoes. The sport shoe and educational device includes a plurality of paired eyelets which are adapted to be threaded or laced through by shoelaces, and with numerical indicia or color coding being associated with each eyelet providing intelligence for the proper sequence to be employed in lacing and tying the shoe. Furthermore, the shoes also include on the foxing tapes thereof correlative pictorial, color coded and grammatical instructional indicia setting forth, in sequential steps along the lengths of the foxing tapes, the proper procedure for lacing the shoelaces through the eyelets in the successive order of the numerical indicia or color coding associated with each eyelet.

9 Claims, 3 Drawing Figures

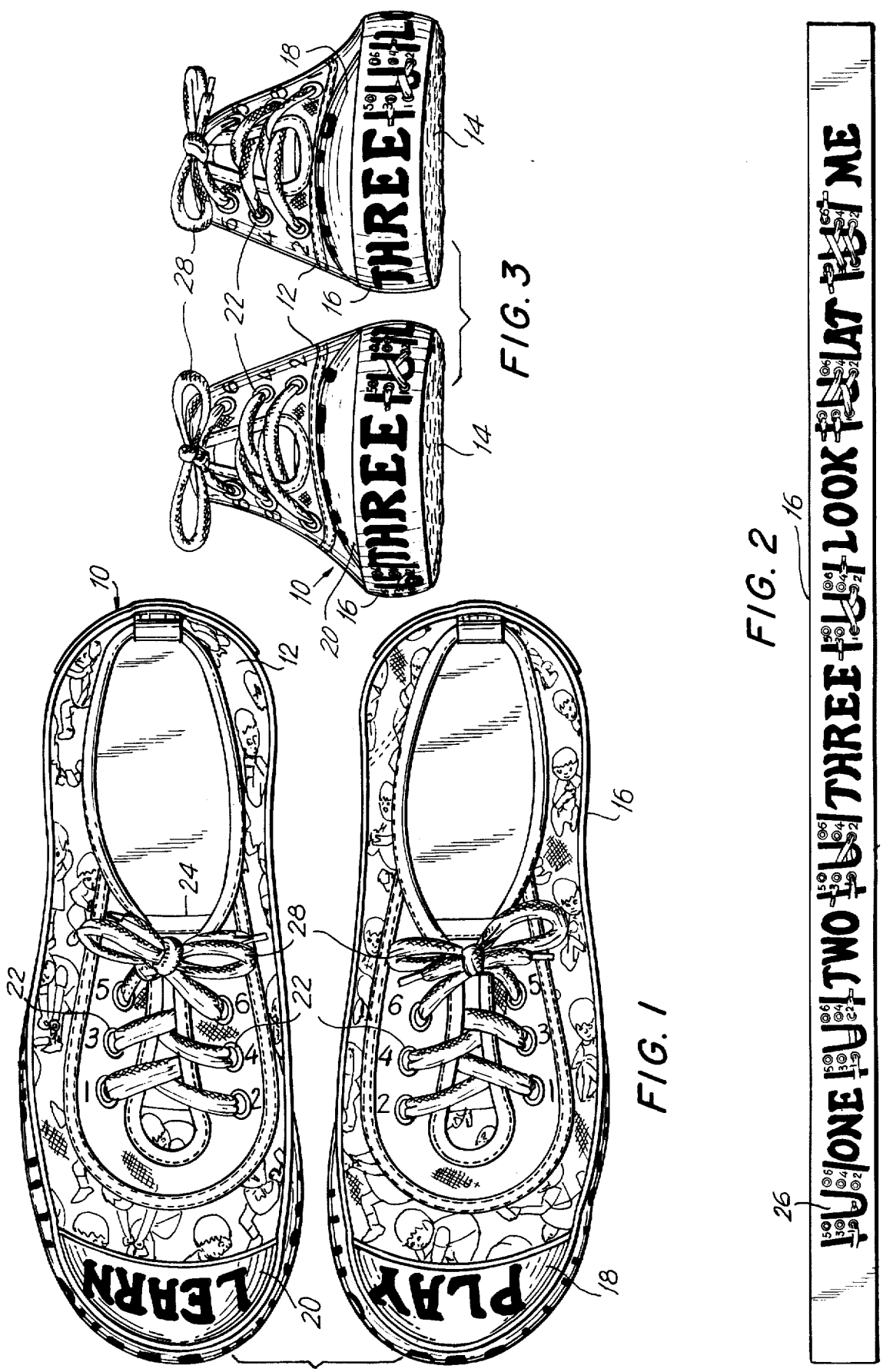

COMBINED SPORT SHOE AND EDUCATIONAL DEVICE

FIELD OF THE INVENTION

The present invention relates to sport shoes, and more particularly, a sport shoe construction which includes, in combination therewith, a novel educational device for teaching a wearer to lace and tie the shoes.

DISCUSSION OF THE PRIOR ART

Sport shoes of the so-called "sneaker-type" are well known in the art and are widely sold in commerce. These sport shoes generally are made in a multitude of widely varying designs, patterns, colors and material combinations, all of which are adapted to enhance the aesthetic appearance of the sport shoes so as to increase their sales appeal. In particular, sport shoes are, amongst others, most frequently worn by children of tender age for extensive periods of time during practically all seasons of the year. Many of these young children wear these sport shoes during their formative years, in effect, during the years when they are learning the basic tenets of reading and writing, and how to dress themselves without anyones assistance. Generally, during those years these childen have not yet fully learned how, or have difficulties in properly lacing and tying shoes of the above-mentioned type which, usually, include eyelets and shoelaces adapted to be threaded or laced through the eyelets. In particular, these children encounter difficulties in threading the shoelaces through the shoe eyelets in their correct lacing sequence and then tying the shoelaces after completion of the lacing operation.

SUMMARY OF THE INVENTION

Accordingly, it is an object of the present invention to provide a pair of sport shoes which include an educational device instructive in teaching the lacing and tying of the sport shoes.

Another object of the present invention is to provide a pair of sport shoes including decorative indicia thereon which forms an education device.

Yet another object of the present invention is to provide an educational device for teaching children of tender years the lacing sequence for a shoe of the above-described type.

A further object of the present invention is to provide an educational device, in combination with a pair of sport shoes, which is adapted to instruct the wearer of the sport shoes in the proper sequence of lacing and tying the shoes.

A still further object of the invention is to provide a novel foxing tape for the sport shoes which incorporates an educational device as described.

In essence, the present inventive pair of sport shoes and educational device includes a plurality of paired eyelets which are adapted to be threaded or laced through by shoelaces, and with numerical indicia or color coding being associated with each eyelet providing intelligence for the proper sequence to be employed in lacing and tying the shoe. Furthermore, the shoes also include on the foxing tapes thereof correlative pictorial, color coded and grammatical instructional indicia setting forth, in sequential steps along the lengths of the foxing tapes, the proper procedure for lacing the shoelaces through the eyelets in the successive order of the numerical indicia or color coding associated with each eyelet.

BRIEF DESCRIPTION OF THE DRAWINGS

Reference may now be had to a preferred embodiment of the inventive sport shoes including the novel education device thereon, taken in conjunction with the accompanying drawings; in which:

FIG. 1 illustrates, in plan view, a pair of sport shoes including an educational device according to the present invention;

FIG. 2 shows a foxing tape for the sport shoes in an extended condition; and

FIG. 3 shows a front view of the sport shoes of FIG. 1.

DETAILED DESCRIPTION

Referring now in detail to the drawings, FIG. 1 illustrates a pair of sport shoes 10 each having suitable uppers 12 which may be formed of any type of material commonly employed in sport shoe construction such as, for example, canvas or the like. The uppers 12 are joined or fastened to rubber-type soles 14, the latter of which are peripherally encompassed by suitable foxing tapes 16. If desired, bumper portions may be superimposed on the foxing tapes at either the front toe or rear heel ends of the shoes.

In the illustrated sport shoe construction, the shoes each include a toe cap portion 18 for the left shoe and toe cap portion 20 for the right shoe each optionally having, respectively, decorative indicia provided thereon, such as PLAY and LEARN. This, of course will enhance the aesthetic appeal and saleability of these shoes, rendering them particularly attractive to children of tender age. Additionally, the canvas portions of the uppers 12 may also have suitable decorations or figurines embossed or imprinted thereon so as to still further increase their sales appeal.

In the present instance, each shoe is provided with six lacing eyelets 22 located in two rows of each three eyelets, which extend along both sides of a shoe tongue 24. As illustrated, each oppositely located pair of eyelets is numbered, starting from toward the front of the shoe or lower end upwardly, so as to form respectively paired eyelet numbers 1 and 2, 3 and 4; and 5 and 6.

The foxing tape 16 is provided, as shown in FIG. 2, with decorative indicia which is representative of the lacing or eyelet portions of the shoes, in effect, showing the location of the eyelets and the numbering thereof. Furthermore, between adjacent pictorial representations 26 for the eyelets which may be sequentially embossed or imprinted along the foxing tapes 16, suitable instructive legends are provided which may be concurrently educational and in the form of a rhyme appealing to children of tender age setting forth ONE, TWO, THREE, LOOK AT ME which are interspersed by the pictorial representations 26. The educational instructions, which are directed primarily at children of tender age who are in the basic stages of learning how to read, show the proper sequence for lacing the shoes or, in effect, threading the shoelace 28 through the eyelets 22 by referring to the sequential pictorial representation 26 on the foxing tape.

Thus, having reference to the foxing tape 16 and successively viewing the illustrations from left to right, the initial step of commencing the lacing of a shoelace 28 through the eyelets 22 is demonstrated in the passing of one end of the shoelace through eyelet number 1. The second representation shows the shoelace extending through eyelet 2, the third representation as it is passed through eyelet 3, the fourth illustration to how the other end of the shoelace is passed through eyelet 4 and then through eyelet 5, and finally the first shoelace end which extends from eyelet 3 through eyelet 6 so as to complete the lacing sequence for each shoes.

In a modified embodiment of the present invention, in lieu of the numerical indicia being associated with each of the eyelets 22, suitable color coding may be employed. Thus, for example, various of the eyelets may be colored red, and others blue in a color pattern which is analogous to the numbering sequence discussed in connection with the previous embodiment. Concurrently, the opposite ends of the shoelace 28 which is to be threaded through the eyelets is similarly color coded, in effect, one end of the shoelace is colored red, whereas the other end is colored blue.

Thus starting from the lowermost eyelet 22, a child will lace the red end of the shoelace through the red eyelet in an upward sequential order, and the blue end of the shoelace through the blue eyelets.

The foxing tape 16 will be, of course, similarly color coded to provide teaching instructions regarding the correct shoe lacing and tying sequence for the shoe. Needless to say the present embodiment is not limited to color combinations of red and blue, but numerous other color combinations may be utilized in keeping with the overall color and decorative scheme on the shoes.

This embodiment is of particular advantage when the shoes are to be worn by children of extremely tender years, who have not yet mastered the fundamentals of recognizing numerical sequences, and to whom color coding or recognition may be a much simpler task.

The educational device according to the invention thus instructs a child in the proper lacing sequence for the sport shoes and is applicable to any type of shoe having eyelets and therewith associated shoelaces. Consequently, the present sport shoe structure forms not only a highly decorative and aesthetically appealing shoe, but also provides an educational device for a child of tender years adapted to teach the latter the correct procedure in lacing and tying shoes.

Quite apparently, the overall shoe arrangement and the indicia embossed or imprinted thereon may be provided in numerous color, pattern and pictorial variations so as to render the shoe applicable for use by children of both sexes and different ages.

While there has been shown what is considered to be the preferred embodiment of the invention, it will be obvious that modifications may be made which come within the scope of the disclosure of the specification.

What we claim is:

1. In combination with a sport shoe having a plurality of shoe lacing apertures and a shoelace adapted to be threaded through said lacing apertures for tying said shoe; an educational device for teaching a wearer the sequence of tying said shoe; comprising indicia on said shoe adjacent each said lacing aperture, and legend means on another portion of said shoe, said legend means including instructional directions for lacing said lace through said apertures and tying said shoe by sequential threading of said lace through said apertures in conformance with said indicia.

2. The combination as claimed in claim 1, said indicia comprising numerals.

3. The combination as claimed in claim 1, said indicia comprising said lacing apertures being color-coded, and said shoelace having complementary color-coded ends adapted to be threaded through identically color-coded lacing apertures.

4. The combination as claimed in claim 1, said shoe comprising a foxing tape extending thereabout, said legend means including said lacing directions being provided on said foxing tape.

5. The combination as claimed in claim 4, said indicia comprising numerals, said legend means including correlated numerals and graphical shoe lacing instructions.

6. The combination as claimed in claim 4, said indicia comprising color-coded lacing apertures, said legend means including correlated color-coding and shoe lacing instructions.

7. A method of teaching the tying of shoes of the type including a plurality of lacing eyelets and a foxing tape encompassing the sole portion of the shoe, comprising providing identifying indicia for each of said eyelets; and imparting correlative instructional legends for tying said shoes onto the foxing tape so as to enable a wearer to tie the shoe by threading a shoelace through said eyelets while concurrently referring to the instructional legends on said foxing tape.

8. A method as claimed in claim 7, said identifying indicia for said eyelets being consecutive numbers, and said instructional legends on said foxing tape including sequential pictorial and graphical indicia providing visual instructions for sequentially threading said shoelaces through said eyelets.

9. A method as claimed in claim 8, said identifying indicia comprising color-coding said lacing eyelets and the ends of said shoelace, and said instructional legends on said foxing tape including sequential pictorial, color-coding and graphical indicia providing visual instructions for sequentially threading said shoelaces through said eyelets.

* * * * *